Jan. 21, 1936.  B. H. SCHENK  2,028,691
METHOD OF PACKAGING ARTIFICIAL SAUSAGE CASINGS AND PRODUCT
Filed June 8, 1934
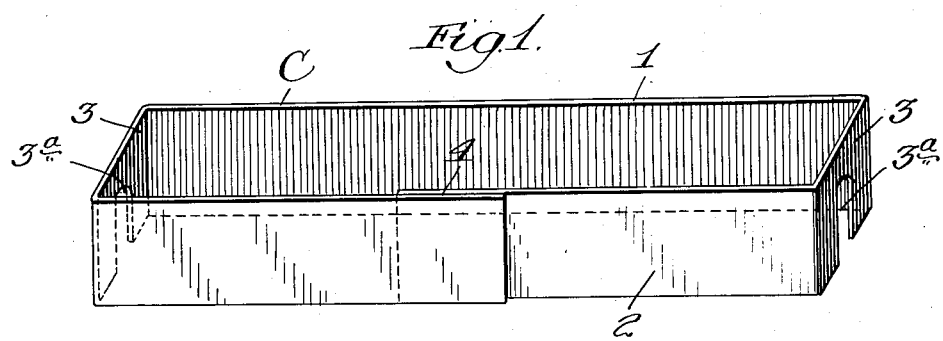
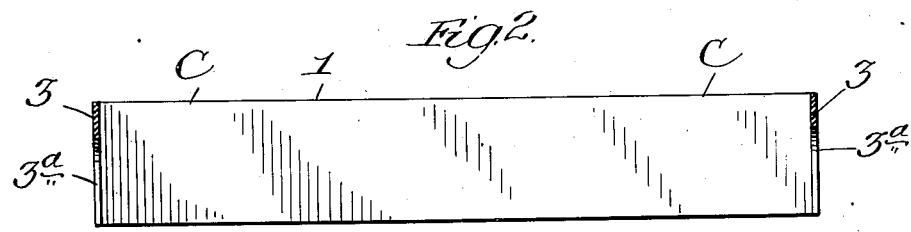
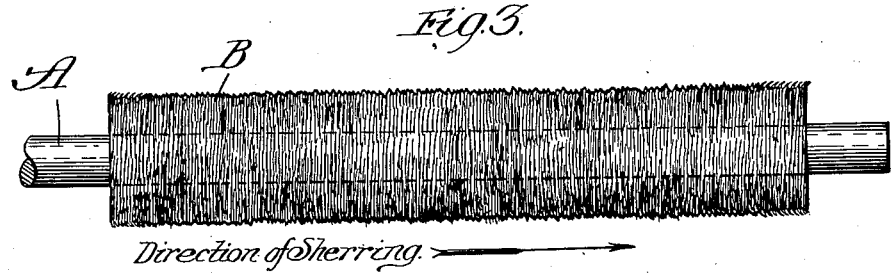
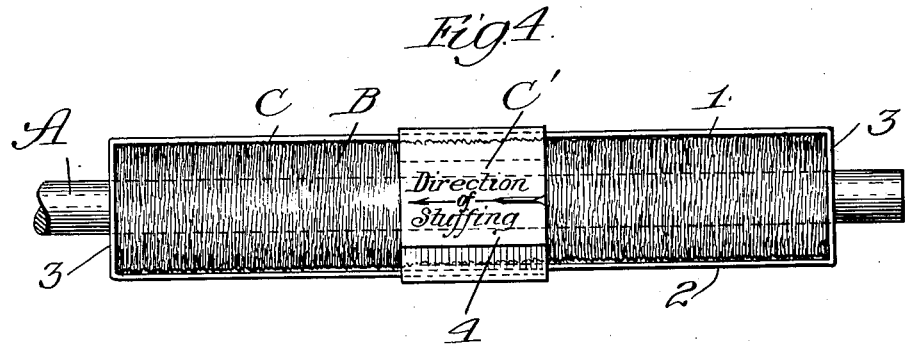
Inventor:
Bernard H. Schenk Patented Jan. 21, 1936

2,028,691

UNITED STATES PATENT OFFICE 2,028,691

METHOD OF PACKAGING ARTIFICIAL SAUSAGE CASINGS AND PRODUCT

Bernard H. Schenk, Chicago, Ill., assignor to The Visking Corporation, Chicago, Ill., a corporation of Virginia Application June 8, 1934, Serial No. 729,691

10 Claims. (Cl. 206—46)

This invention relates particularly to a method of packaging artificial sausage-casings, or the like, and to the new article of manufacture thereby produced.

The primary object is to provide a novel packaging method and packaged product, which introduces substantial economies into the manufacture and use of artificial sausage-casings.

Seamless cellulose casings, for example, are now being manufactured on a large scale by an American manufacturer. In dealing with casings of relatively small diameters and thin walls it has been an extensive practice of the manufacturer above referred to to shir the regenerated, purified, dried tubing on a mandrel; then slip the shirred tubing onto a wooden supporting-rod, or elongated dowel-pin; and then make shipment of the product, thus loaded, to sausage manufacturers. It was the practice for the sausage manufacturer to place the wooden dowel-pin in alignment with the stuffer-horn of a sausage machine, slip the shirred casing from the dowel-pin onto the stuffer-horn, and then proceed in the usual manner to stuff the casing.

The practice referred to involved unnecessarily large expense for wooden supporting rods and unnecessarily large expense for freight.

The present invention makes use of the principle of preliminarily shirring a casing upon a suitable mandrel, then compressing the casing axially to bring the folds into close mutually supporting relation, and then confining the casing in a container which will prevent undue expansion of the casing, and which is suitable for shipping purposes. The improved package can be slipped onto the horn of a sausage-stuffing machine, after which the container may be readily removed, leaving the compressed shirred casing upon the stuffer-horn. The stuffing operation may then be carried on in the usual manner.

The invention is illustrated in the accompanying drawing, in which—

Fig. 1 is a perspective view of a simple form of container for the compressed, shirred casing; Fig. 2, a vertical longitudinal sectional view of the same; Fig. 3, a broken view of a mandrel showing a compressed, shirred casing thereon, the container being capable of being slipped into position to house the casing while the latter is still on the mandrel; and Fig. 4, a plan view of the packaged casing still on the mandrel, a retaining-band having been slipped onto the packaged product.

The packaged product shown in Fig. 4 can be removed from the mandrel by sliding it longitudinally off the end of the mandrel.

In the illustration given, A designates a mandrel; B, a compressed, shirred casing; C, an open-sided container; and C', an endless retainer-band adapted to retain the casing in the container during shipment and handling.

To place the casing in condition for packaging, it is first preliminarily shirred on the mandrel A. The casing may, for example, be reduced by the preliminary shirring operation from a length of about 32 feet to a length of, say, 12 inches to 16 inches. It may then be reduced by longitudinal compression on the same mandrel or on another mandrel to, say, about one-third of its shirred-length. In the latter operation, the folds of the shirred casing are so closely packed together as to make these folds mutually supporting.

After compression, the casing is capable of being handled with considerable freedom and is self-sustaining in large measure. The delicate product, which ordinarily may have a wall-thickness of from a little more than .0007" to, say, .00008", for casings having a range of diameters from about $1\frac{1}{2}$" to $1\frac{1}{8}$", can be safely compressed in the manner stated above. The reduction from the original length may extend as far as about 1/130th, although it is preferred not to carry the reduction quite so far.

It has been found very practicable to reduce a tube of the length of 33 feet to a length of something less than 5", and then allow it to expand slightly in the retainer, say to $5\frac{1}{4}$".

The container C is shown as an elongated member comprising side walls 1 and 2 and end-walls 3, the latter provided with U-shaped openings 3ª. The container may be formed from a narrow strip of cardboard, the ends being spliced as indicated at 4.

It will be evident that after the shirred casing B has been compressed to the condition shown in Fig. 3, the container C may be placed, by a lateral movement, over the casing while the latter is still on the mandrel, the slots 3ª accommodating the mandrel. The endless band C', preferably of light cardboard, is then slipped onto the package, after which the loaded container is slipped longitudinally off the mandrel.

The loaded containers are packed in suitable cardboard boxes and may be shipped to sausage manufacturers in the usual manner.

The sausage manufacturer takes the loaded container and slips it longitudinally onto the stuffer-horn of the sausage machine (not shown);

he then removes or tears off the band C' and then lifts the container by lateral (upward) movement from the stuffer-horn, thus leaving the compressed, shirred casing on the stuffer-horn. The stuffing operation may then be carried out in the usual manner.

The preliminarily shirred casing may be compressed so far as to permit the container to be slipped readily over the compressed product. A slow expansion of the compressed product commences after the compressing-pressure has been removed; and, were the compressed product left free from restraint, it would grow greatly in length. However, it is readily held against undue expansion by a light container of the form described.

The invention provides a novel method and product which very substantially reduces the cost of manufacture, reduces the freight costs, and greatly facilitates the manufacture and use of the product.

It has been found that a shirred casing prepared in the manner described above can be stuffed more successfully if it is placed on the stuffer horn so as to be drawn off in a direction opposite the direction of shirring. This is due to the fact that in shirring the casing the outer edges of the shirring-folds have a tendency to bend or curl forwardly. In Fig. 3, the arrow indicates the direction in which the casing was fed on the mandrel in the shirring operation; and in Fig. 4, the proper direction for stuffing is indicated on the retainer-band C'.

In the employment of the present invention, hand-contact with the casing may be eliminated or reduced to a minimum, which is of importance from a sanitary standpoint.

The foregoing detailed description has been given for clearness of understanding only, and no undue limitations should be understood therefrom, but the appended claims should be construed as broadly as permissible, in view of the prior art.

What I regard as new and desire to secure by Letters Patent is:

1. A method of preparing artificial sausage-casings for shipment and handling which comprises: applying to a compressed, shirred casing while on a mandrel a container having cut-away end-walls which accommodate the mandrel.

2. A method of preparing sausage-casings for shipment and handling which comprises: applying to a compressed, shirred casing a container having an open side and having end-walls provided with openings, adapted to permit the packaged product to be slipped onto a stuffer-horn.

3. A method of preparing sausage-casings for shipment and handling which comprises: applying to a compressed, shirred casing, while supported on a mandrel, an open-sided container having an opening in its end adapted to accommodate the mandrel; and applying an endless band about the package.

4. A new article of manufacture comprising a container having end-walls provided with end-openings, and a shirred casing confined in said container between said end-walls, the bore of said shirred casing registering with said end-openings, thus permitting the casing to be applied to a stuffer-horn without removal from said container.

5. A new article of manufacture comprising a container having an open side and having end-walls provided with recesses, and a shirred casing in said container having a bore registering with said recesses, whereby the packaged casing may be slipped onto a stuffer-horn and the container removed by lateral movement.

6. A new article of manufacture comprising a container having two open sides and having an end-wall provided with openings adapted to admit a stuffer-horn, and a shirred casing in said container having a bore registering with said openings.

7. An article as specified in claim 6, combined with a band encircling said container and serving to prevent displacement of the shirred casing.

8. A new article of manufacture comprising a container consisting of an elongated cardboard band having recessed end-walls, and a compressed, shirred casing held under compression within said container and having a bore registering with the recesses in said end-walls.

9. An article as specified in claim 8, combined with a relatively small transverse band encircling the container and confining the casing against lateral displacement.

10. A container for the purpose set forth comprising an elongated endless cardboard band having recessed end-walls, said container having two opposite open sides, and a relatively short transverse band encircling the intermediate portion of said first-mentioned band.

BERNARD H. SCHENK.